United States Patent [19]

Davis, Jr.

[11] 4,275,319
[45] Jun. 23, 1981

[54] OIL-FILLED SUBMERGIBLE ELECTRIC PUMP MOTOR WITH IMPROVED STATOR WINDING INSULATION

[75] Inventor: Paul W. Davis, Jr., Dewey, Okla.

[73] Assignee: TRW Inc., Cleveland, Ohio

[21] Appl. No.: 44,574

[22] Filed: Jun. 1, 1979

[51] Int. Cl.³ .......................... H02K 1/04; H02K 5/10; F04B 17/00

[52] U.S. Cl. .................................. 310/43; 310/87; 417/424; 428/519

[58] Field of Search ........................... 310/43, 45, 87; 417/424; 428/517, 519

[56] References Cited

U.S. PATENT DOCUMENTS

| | | | |
|---|---|---|---|
| 812,657 | 2/1906 | Kitsee | 260/880 R |
| 1,613,673 | 1/1927 | Ostromislensky | 260/880 R |
| 1,951,919 | 3/1934 | Arutunoff | 417/415 |
| 1,970,484 | 8/1934 | Arutunoff | 310/87 |
| 2,001,649 | 5/1935 | Arutunoff | 310/87 |
| 2,066,330 | 1/1937 | Carothers et al. | 260/880 R |
| 2,236,887 | 4/1941 | Arutunoff | 310/90 |
| 2,251,816 | 8/1941 | Arutunoff | 310/87 |
| 2,270,666 | 1/1942 | Arutunoff | 417/424 |
| 2,315,917 | 4/1943 | Arutunoff | 310/87 |
| 2,391,038 | 12/1945 | Rifenbergh | 336/205 |
| 2,407,143 | 9/1946 | Daur et al. | 260/880 R |
| 2,418,978 | 4/1947 | Mertens | 260/880 R |
| 2,524,536 | 10/1950 | Nordlander et al. | 260/880 R |
| 2,646,418 | 7/1953 | Lang | 260/880 R |
| 2,700,185 | 1/1955 | Lee | 260/880 R |
| 2,742,378 | 4/1956 | Te Grotenhuis | 260/880 R |
| 2,749,456 | 6/1956 | Lvenberger | 310/87 |
| 2,754,282 | 7/1956 | Stoops et al. | 260/880 R |
| 2,877,200 | 3/1959 | Carpenter | 260/880 R |
| 3,151,184 | 9/1964 | Safford | 260/880 R |
| 3,185,659 | 5/1965 | Adams et al. | 260/880 R |
| 3,233,311 | 2/1966 | Giegerich et al. | 336/94 |
| 3,235,825 | 2/1966 | Davis | 260/880 R |
| 3,265,765 | 8/1966 | Holden et al. | 260/880 R |
| 3,592,878 | 7/1971 | Kromolicki | 260/880 R |
| 3,621,430 | 11/1971 | Shimizu | 336/205 |
| 3,636,141 | 1/1972 | O'Neill et al. | 260/880 R |
| 3,672,795 | 6/1972 | Arutunoff et al. | 417/424 |
| 3,775,719 | 11/1973 | Gainer | 336/94 |
| 3,855,194 | 12/1974 | Conard | 260/880 R |
| 3,909,507 | 9/1975 | Betts et al. | 174/102 SC |
| 3,970,723 | 7/1976 | Mees et al. | 260/880 R |
| 3,987,124 | 10/1976 | Hardwicke et al. | 260/880 R |
| 4,011,284 | 3/1977 | Gawne et al. | 260/880 R |
| 4,012,462 | 3/1977 | Chaudhary | 260/880 R |
| 4,026,969 | 5/1977 | Mostert et al. | 260/880 R |
| 4,070,420 | 1/1978 | Ambrose | 260/880 R |
| 4,076,255 | 2/1978 | Moore | 260/880 R |
| 4,081,497 | 3/1978 | Tokumitsu et al. | 260/880 R |
| 4,085,186 | 4/1978 | Rainer | 260/880 R |
| 4,125,573 | 11/1978 | Kruse | 260/880 R |

OTHER PUBLICATIONS

McClenahan, "The Significance of Hydrolysis Tests on Film Insulated Magnet Wire in Predictive Suitability in Hermetically-Sealed Units" IEEE Conference Paper cp 63-500.

Primary Examiner—William R. Dixon, Jr.
Attorney, Agent, or Firm—Shapiro and Shapiro

[57] ABSTRACT

The operating life of oil-filled submergible electric pump motors is substantially increased by impregnating the stator with a hydrolytically stable varnish. In the preferred embodiment the varnish comprises a heat curable, liquid homopolymer or copolymer of 1, 3 butadiene.

9 Claims, 3 Drawing Figures

OIL-FILLED SUBMERGIBLE ELECTRIC PUMP MOTOR WITH IMPROVED STATOR WINDING INSULATION

BACKGROUND OF THE INVENTION

This invention relates to submergible electric pump motors and is particularly concerned with increasing the operating life of such motors by improvements in the insulation system for the stator windings.

For many years submergible pump units have been employed in the pumping of oil or water from wells. Typically, the submergible pump unit comprises an electric motor and a centrifugal pump suspended colinearly in the well by tubing or cable, with the entire pump unit submerged in the liquid to be pumped. The submergible pump motor is normally filled with an oil that serves to lubricate moving parts, insulate electrical parts, cool the motor, and exclude the ambient well fluid from the interior of the motor. Some means, such as a protector containing oil, accommodates the thermal expansion and contraction of the oil resulting from the running and non-running cycle of the motor. Representative submergible pump units are disclosed, for example, in U.S. Pat. Nos. 1,951,919; 1,970,484; 2,001,649; 2,236,887; 2,251,816; 2,270,666; 2,315,917; 3,672,795, all assigned to the same assignee as the present invention.

Submergible electric pump motors employed to pump from great depths may be 50 feet in length, for example, and may be stacked to provide the motive power required to drive an equally lengthy pump. Such pump motors are not inexpensive, and when they fail in service, the pump unit must be pulled from the well—an expensive procedure. Accordingly, sophisticated insulation systems are employed in the pump motors to minimize electrical breakdowns. For example, the stator structure of one type of submergible motor sold by the assignee of the present invention includes insulating sleeves at top and bottom, insulating laminations at opposite ends of the steel laminations, insulating slot liner tubing for the windings, multiple layers of insulation on the winding conductors themselves, insulating tape on the end turns, insulating sleeves on the connection to the end turns, and an insulating varnish that impregnates the entire internal stator structure. The materials of which the various insulating components are composed are selected to provide long life, according to the data provided by the manufacturers of the insulation, and from this data one would expect that the submergible motors would operate for long periods of time free of electrical breakdowns. Unfortunately, such is not the case. Indeed, electrical insulation failures in submergible motors greatly reduce the useful life of such motors in practice.

Failures of submergible electric pump motors are to be expected, for submergible pump units are often called upon to operate in harsh and hostile environments under varying pressure, temperature, and other ambient conditions. Well environments vary widely and are not always predictable. Nevertheless, with sophisticated insulation systems and oil-filled interiors, submergible electric pump motors should be free of electrical breakdowns for much longer periods than has proven to be the case.

When submergible pump motors fail electrically, the ultimate failure is commonly a power arc, which may melt part of the stator. After the failure, it is difficult to ascertain precisely what happened to cause the failure. Moreover, because of the diverse and unpredictable environments in which submergible motors operate, there has been no ready solution to the electrical failure problem. The present invention solves that problem.

BRIEF DESCRIPTION OF THE INVENTION

Accordingly, an object of the invention is to increase the useful life of oil-filled submergible electric pump motors.

Another object of the invention is to provide improved insulation for the stator structure of oil-filled submergible electric pump motors.

A further object of the invention is to provide improved impregnants for the stator structure of oil-filled submergible electric pump motors.

Yet another object of the invention is to provide improved varnishes for insulating stator winding conductors and the like.

Briefly stated, in one of its broader aspects the invention comprises, in an oil-filled submergible electric pump motor, a stator structure with insulated wires impregnated by a hydrolytically stable impregnant.

BRIEF DESCRIPTION OF THE DRAWINGS

The invention will be further described in conjunction with the accompanying drawings, which illustrate a preferred and exemplary embodiment, and wherein.

DETAILED DESCRIPTION OF THE INVENTION

Figure 1:
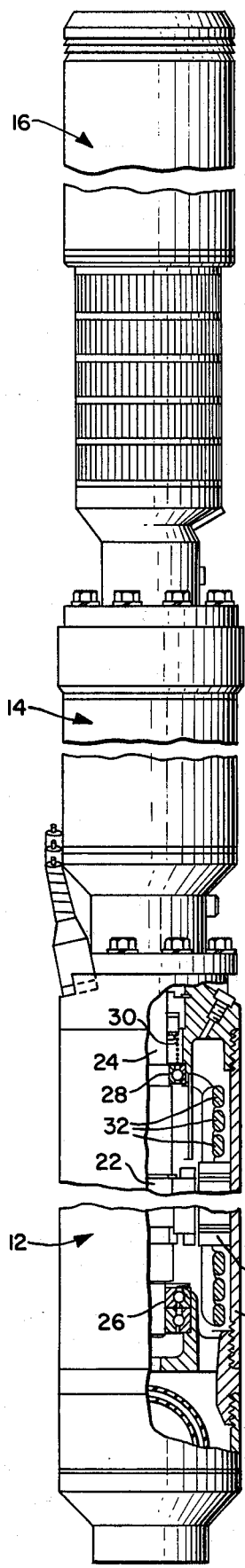
FIG. 1 is a contracted vertical sectional view of a submergible pump unit in which the present invention may be employed.

FIG. 1 illustrates a typical type of submergible pump unit 10 in which the present invention may be employed. The pump unit comprises an oil-filled submergible electric motor 12, a motor protector 14, and a pump 16, which may be of the centrifugal type. The motor comprises a tubular housing 18, a stator structure 20 mounted interiorly of the housing, and a rotor 22 having a rotor shaft 24, the rotor being supported for rotation coaxially within the stator by means of bearings 26 and 28. As is conventional, the interior of motor 12 is filled with an oil, such as a water white (all hydrocarbon) mineral oil or a synthetic hydrocarbon oil (particularly useful in geothermal or other high temperature environments). The motor shaft has a section extending through protector 14 and coupled to the impeller shaft of pump 16. Protector 14 also contains oil and communicates with the interior of the motor to accommodate expansion and contraction of the oil in the motor in a well known manner. Alternatively, or in addition, the motor may be provided with a pressure compensating expansible chamber. The motor is sealed against entry of the ambient well fluid, and one or more mechanical seals 30 are provided to prevent leakage of well fluid along the motor shaft and into the motor. The winding structure 32 of the motor is shown somewhat diagrammatically. Typically, the motor may be a three-phase squirrel-cage induction motor, with the stator windings 32 providing the motor field. The pump unit may be suspended in the well fluid by tubing threaded onto the upper end of the pump, and the pump may discharge through the tubing. Alternatively, the pump unit may be a cable suspended unit, and, if desired, the pump may discharge through a liner. Various types of submergible pump units are well known, and pump unit 10 is merely an example of a submergible pump unit in which the invention may be employed.

Figure 2:
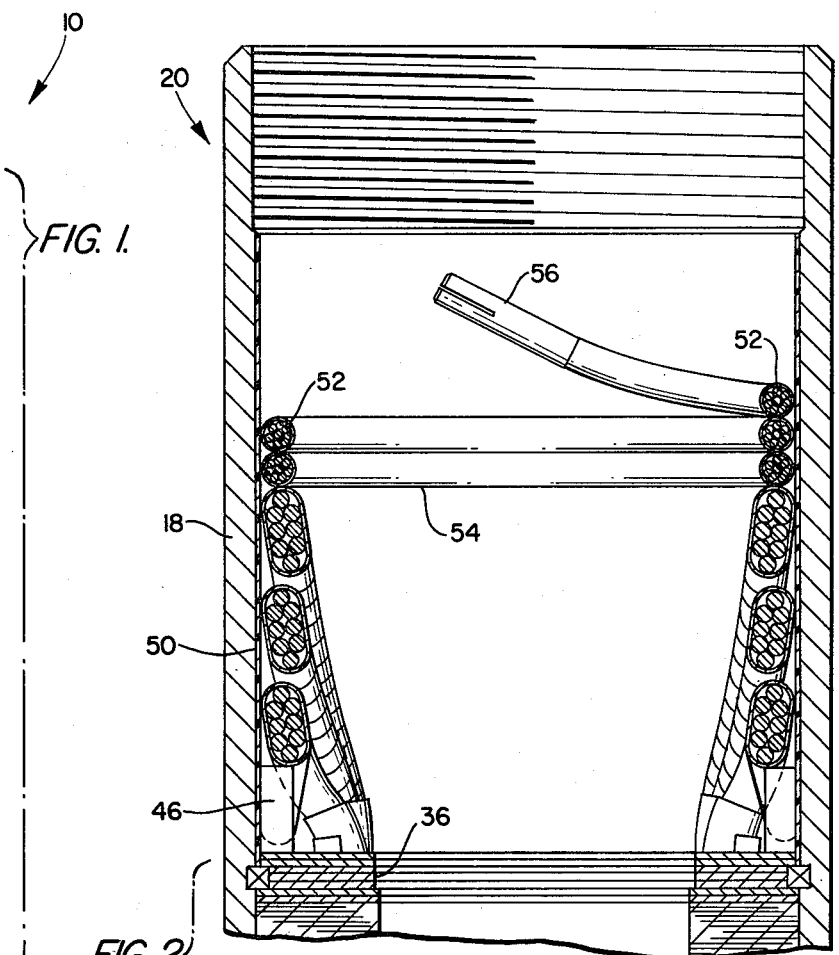
FIG. 2 is a contracted longitudinal sectional view of the stator structure of an oil-filled submergible electric pump motor in which the invention may be employed.
Figure 2:
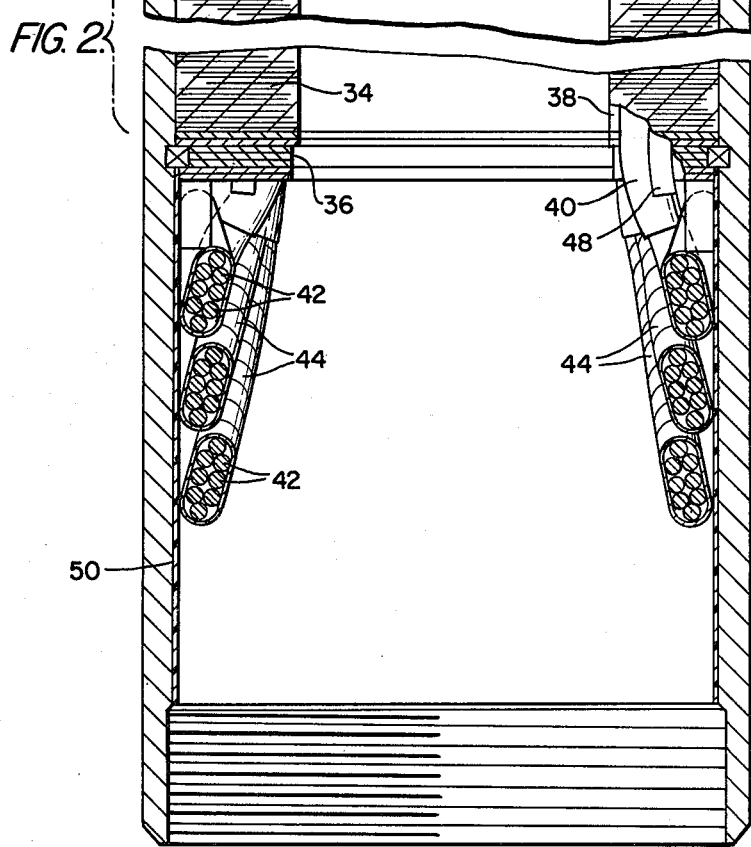

FIG. 2 illustrates, in greater detail, a stator structure in which the invention may be employed. The stator structure comprises a stack of steel laminations 34 at opposite ends of which are insulating laminations 36. In the usual manner, the laminations are perforated to provide longitudinal slots, such as the slot 38, spaced about the circumference of the stator. Each slot contains a slot liner 40, which may be in the form of fluorinated ethylene propylene copolymer thin wall tubing. Insulated magnet wire conductors 42 are inserted in the slot liners to form the stator windings, the pattern of the windings depending upon the type of motor, as is well known. Glass tape 44 is wrapped about the conductors 42 where they emerge from the slot liners and is usually in the form of a woven glass cloth that binds the emerging wires together to form a strong structure that will resist the electromechanical forces exerted on them during motor operation. Conductors 42 themselves are individually insulated. The conductors may be D-film wire, for example, in which a copper wire is covered with a normal film magnet wire insulation, such as Dupont aromatic polyimide, Pyre-ML. On top of the aromatic polyimide film coating is wrapped an aromatic polyimide tape, such as Kapton sold by Dupont. The surface of the tape facing the conductor is coated with a fluorinated ethylene propylene copolyer, Teflon FEP, which serves as a hot melt adhesive. The Kapton tape is wrapped tightly about the film insulated magnet wire in an overlapped helical fashion and is bonded to the wire and itself by the application of heat.

Coil forming blocks 46 are employed as mechanical aids to provide the desired curvature of the wires in the end turns, and wedges 48, which may be half-round pieces of aramid sheet material (such as Nomex) are forced down into the slots after the wires are in place and serve to hold the winding wires in the slots mechanically. Insulating sleeves 50 separate the end turns from the housing 18 of the motor. Lead wires 52, insulated with tubing 54, are soldered or otherwise connected to the stator windings 42. A connector 56 at the end of the lead wires serves to connect the stator windings to a power cable (not shown) or to a succeeding stator section (where stacked sections are employed). The stator structure also commonly includes mousing wire, nylon cord, additional insulating sleeving or "spaghetti" and other well known parts.

Another, most important component of the insulation system of the stator structure is a varnish that impregnates the interior of the stator. A common type of varnish employed heretofore in stators of the type shown is a solvent diluted, heat curable, baking varnish containing a heat curing phenolic resin which has been modified with an isophthalic alkyd type saturated polyester, an example of which is Hi-Therm BC-325, Class F, sold by John C. Dolph Company of Monmouth Junction, New Jersey. Some of the properties of this varnish, as described in the manufacturer's data sheet are "tough, glossy, marproof, film . . . high bond strength . . . quick cure . . . excellent oil resistance . . . high dielectric strength, and excellent resistance to water, acid, alkali, and salt water." The manufacturer recommends its use in, inter alia, stators and rotors, and states that the varnish has a heat life of 20,000 hours at 165° C. as determined by AIEE No. 57 (Twisted Pairs). The stator may be impregnated with the varnish by standard vacuum impregnating techniques. Oil-filled submergible electric pump motors having stators of the type shown in FIG. 2 and impregnated with such varnish have been sold for some years by the assignee of the present invention and are widely used. Similar motors sold by other manufacturers are also in common use.

With such an elaborate insulation system and with long life of the essential insulating components predicted from data published by the manufacturers of the insulation, very long motor life would be expected, but this has not proven to be the case. A standard life expectancy is not easy to determine, because there is no standard well and one would expect the well environment to have a significant effect on the motor lifetime. Nevertheless, an average motor life of about 500 days or 12,000 hours in a well having an ambient temperature of about 180° F. is a reasonable figure based upon actual experience. The winding temperature of the motor may rise about 75° F. over ambient, and the average winding temperature may be about 125° F. Considering the published thermal aging data on the insulation materials employed and applying such data to the average case, one would expect a mean life to electrical failure that is many times the value that experience shows to be the case. Indeed, the motors should be lasting many orders of magnitude longer than they are, without electrical failures. To summarize, there are gross differences between the motor lifetime observed and what would be expected.

Various hypotheses can be offered in an attempt to explain electrical failures in a motor. For example, vibration, repetitive thermal expansion-contraction cycles, surge currents, or overvoltages could explain insulation failures. Indeed, all of these conditions are likely to be present in varying degrees in submergible electric motors, and determining the cause of electrical failures is not a simple task, particularly where the enviroments vary from well to well and where causation may be obscured by gross arcing at the moment of ultimate failure. Moreover, each of the insulation components is a possible suspect in the failure.

With this background, the present invention is a remarkable discovery of a major cause of electrical failures in oil-filled submergible pump motors, and of the solution to that problem. Indeed, testing of the invention, as will be described hereinafter, demonstrates that the invention greatly increases the life of oil-filled submergible electric pump motors.

Underlying the present invention is the discovery that premature failure of the insulation in oil-filled submergible electric pump motors is caused by a hydrolytic attack upon the varnish, and other insulation components, employed heretofore in such motors. More particularly, it has been discovered that the useful life of the insulation system of such motors may be greatly increased by providing a water resistant barrier about the insulation and by impregnating the insulation system with a hydrolytically stable impregnant.

Water, of course, is present in almost all well environments, and despite the filling of submergible motors with oil and efforts to seal the interior of the motor from the ambient well fluid, leakage of water into the motors has been experienced. Improved seals and sealing techniques have mitigated the water leakage problem somewhat, but after prolonged use, some water enters the motor. When an end cap is removed from an oil-filled submergible pump motor which has been returned to the manufacturer for service, it is not uncommon to observe a layer of water that escapes from the motor along with the motor oil. In fact, one hypothesis offered to explain electrical failures is the possibility of gross shorting which might occur via a conductive water bridge. In accordance with the present invention, however, it appears that hydrolytic attack upon insulation components is the actual (or at least the principal) cause of insulation failure.

After the cause of the failures was recognized, the solution to the problem was far from evident. As noted earlier, the insulation system is a multifaceted, sophisticated system bathed in oil, subjected to varying pressure, temperature, and other ambient conditions, as well as electromechanical and merely mechanical vibration, electrical and mechanical shock, and thermal expansion and contraction. The operating environment is not predictable.

In accordance with the invention, it was discovered that employing addition polymer compositions, more specifically polybutadiene-based compositions as an impregnant for the insulation system of an oil-filled submergible electric pump motor solves the insulation failure problem. All condensation polymers are apparently subject to hydrolytic attack under the extreme conditions encountered in submergible motor operation and appear unsuitable for use in the invention. The significance of hydrolysis tests on film-insulated magnet wire in predicting suitability in hermetically-sealed motor units has been considered in an IEEE conference paper of D. L. McClenahan, Paper No. CP 63-500, but the significance of hydrolysis in oil-filled submergible electric pump motors was not recognized prior to the present invention, nor was the solution to the problem apparent.

Particularly useful in the invention is one family of addition polymers, the polybutadienes. Specific varnish or impregnant compositions based upon the polybutadienes and useful in the invention are set forth in the following examples:

EXAMPLE I

| | Material | % by Weight |
|---|---|---|
| 1. | Resin A-1, 1,3 butadiene homopolymer (major resin) | 36.51 |
| 2. | Tert-butyl styrene monomer (monofunctional vinyl monomer) | 43.02 |
| 3. | Divinyl benzene monomer (55% solution) (multifuctional vinyl monomer) | 10.16 |
| 4. | Resin B-1, 1,3 butadiene homopolymer (flexibilizing resin) | 9.13 |
| 5. | 2,5 dimethyl-2,5 bis (tert-butyl peroxy) hexane (initiator-free radical source) | 0.68 |
| 6. | Vinyl-tris (beta-methoxyethoxy) silane additive) | 0.50 |
| | | 100.00 |

Resin A-1 is a high molecular weight (~14,000), homopolymer of 1.3 butadiene having a high (~80%) portion of 1,2 vinyl microstructure. The molecular structure of Resin A-1 can be represented as shown below:

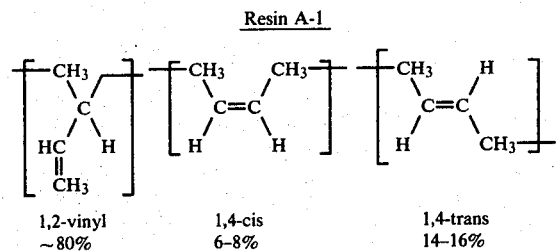

Resin A-1, the major resin, forms the backbone structure upon which the impregnating composition is based. Resin A-1 is commercially available from Colorado Chemical Specialties Co., Golden, Colo., and is normally supplied as a solution in either heptane or a vinyl monomer such as vinyl toluene or tert-butyl styrene. If obtained in a vinyl toluene monomer solution, it is known as Ricon 1595 and has the following properties:

| | |
|---|---|
| chemical composition | high vinyl polybutadiene homopolymer |
| solvent | vinyl toluene monomer |
| nonvolatile matter, wt. % | 80 ± 2% |
| microstructure | 80 ± 5% 1,2 vinyl |
| molecular weight average (M$\bar{w}$) | 14.000 ± 3.000 |
| physical state | clear to hazy viscous liquid |
| viscosity, Brookfield at 25° C., cps | 150,000 ± 90,000 |
| specific gravity | 0.89 g/ml |
| bulk density | 7.4 lbs/gal |
| flash point (tag closed cup) °F. | 127 |
| acid number KOH/g | Nil |
| Gardner color | 3 maximum |
| dilute solution viscosity (6g resin/100ml of solvent) | 0.23 ± 0.03 |

Resin A-1 may be purchased already dissolved in the tertiary butyl styrene monomer employed in the formulation.

The monofunctional vinyl monomer serves to establish crosslinks between active sites (1,2 vinyl groups) on the resin molecules during the curing cycle. The monofunctional vinyl monomer also serves as a reactive diluent to reduce the viscosity of the impregnant formulation to a level suitable for handling and processing. The tertbutyl styrene monomer is available from Dow Chemical Co., Midland, Michigan. Other styrenic monomers could be used, but the tertiary butyl styrene monomer is preferred over styrene, vinyl toluene, or alphamethyl styrene, for example, because of its much lower volatility and vapor prssure. It is preferred not to employ a solvent that must be evaporated before the varnish cures, because voids will inevitably be produced and the vacuum impregnation will be imperfect. Low volatility of the tertiary butyl sytrene avoids this problem.

The multifunctional vinyl monomer serves to establish further crosslinks between active sites (1,2 vinyl groups) on the resin molecules during the curing reactions, and these crosslinks are of a three-dimensional nature. The multifunctional monomer also serves to increase the speed of gellation of the impregnant formulation during the curing cycle which minimizes the loss of monomers through evaporation. Divinyl benzene is preferred over multifunctional acrylate or methacrylate type monomers because it is an all-hydrocarbon crosslinker which does not undergo hydrolysis reactions.

Divinyl benzene monomers are commercially available from Dow Chemical Co., Midland, Michigan as DVB-55, a 55% solution of divinyl benzene monomer in mixed ethylvinyl benzene isomers.

The flexibilizing resin, Resin B-1, is of low reactivity (low 1,2 vinyl content) and serves to increase the average distance between crosslinks in the cured structure. It also moderates the curing reactions and thus tends to prevent the formation of stress cracks and fractures in the cured mass. With a multifunctional vinyl monomer present, curing of the composition tends to be very rapid, and a very hard, very brittle, cured resin that tends to develop mechanical stresses and cracks during curing may result. The flexibilizing resin, a "lazy" resin of low reactivity serves as a moderating resin and flexibilizing material. It slows down the rate of the curing reaction and introduces flexibility into the final product. This flexibility is cured right into the molecule. Flexibility achieved by using a plasticizing oil has the disadvantage that the plasticizer will eventually escape, since there is no chemical bonding to hold it in place. The flexibilizing resin serves to increase the average distance between crosslinking sites and thus provides "hinges" in an otherwise very tight, rigid structure. The molecular structure of Resin B-1 can be represented as shown below:

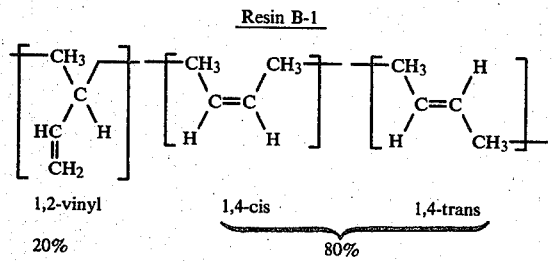

Resin B-1

1,2-vinyl    1,4-cis    1,4-trans

20%    80%

Resin B-1 is commercially available from Revertex Ltd., Temple Fields, Harlow, Essex, England as Lithene N-4-5000. Typical properties of resin B-1 are listed below:

| Chemical composition | |
|---|---|
| polybutadiene | 99–100% |
| terminal benzyl | nil |
| Approximate microstructure of polybutadiene segments: | |
| vinyl 1,2 | 20% |
| trans and cis 1,4 | 80% |
| Appearance and physical form | clear colorless liquid |
| Molecular weight ($\overline{M}_n$) | 5000 approx. |
| Viscosity (Brookfield) | |
| at 25° C. | 40 poise |
| at 50° C. | 16 poise |
| Density | 0.89 g/ml |
| Flash point (C.O.C.) | >260° C. |
| Solvent and other volatiles | ≯1% by wt. |
| Alkali metal ions | ≯50 ppm |

The initiator should be a source of free radicals. These free radicals, generated by thermal decomposition in the case of organic peroxide initiators, initiate or trigger the chain-type curing reaction which then propagates throughout the entire mass of impregnating material. The 2,5 dimethyl-2,5 bis (tert-butyl peroxy) hexane is available commercially as LUPERSOL 101 from Lucidol Div., Pennwalt Corp., Buffalo, N.Y. LUPERSOL 101 is one of many organic peroxides which can serve to initiate polymerization of the resin system. Dicumyl peroxide and ditertiary butyl peroxide initiators are also appropriate. In selecting a peroxide to initiate chain reaction type polymerization in the resin system, the decomposition temperature of the peroxide is significant. The peroxide should actively decompose at a temperature of about 135° C. or higher. Otherwise the polybutadiene is not well incorporated into the system. A sticky or rather gummy product with poor mechanical properties may result.

The additive is used to control or modify a particular property of the impregnating mixture. The substituted silane seves as a coupling agent or adhesion promoter. This molecule reacts at both ends. One end reacts with the polybutadiene resin system and chemically becomes a part of it. The other end is believed to react chemically with hydroxyl groups such as those present on the surface of most mineral filler particles, the surface of the oxide film on the metal laminations, and on the surface of the glass cloth tape used to wrap the end turns of the stator winding. A chemical bridge is thus formed through the coupling agent between a surface containing hydroxyl groups and the resin system. Any of several substituted silanes may be employed. While this component of the composition is not essential, it improves the performance.

Vinyl-tris (beta-methoxyethoxy) silane is commercially available as A-172 from Union Carbide Corporation, 270 Park Ave. New York, N.Y. Other kinds of additives may also be employed as desired. For instance, appropriate surfactants may be employed to modify wetting characteristics or to enhance flow properties. Surfactants may also be used to control foaming problems which may occur during vacuum degassing of the impregnating formulation. Vacuum degassing is commonly performed just prior to using the impregnant in a vacuum impregnating process.

Fillers may also be incorporated in the impregnating mixture. Silica, aluminum oxide, aluminum hydrate, and many other mineral type fillers could be used. However, fillers tend to increase the viscosity of the impregnant, and the uniformity of the impregnation may be affected.

In preparing an impregnant in accordance with the invention, the following procedure may be used: Resin A and the tertiary butyl styrene monomer, which have already been blended by the manufacturer, are weighed and placed in a mix container, which may be a 55 gallon drum, for example. Then the appropriate amount of the divinyl benzene monomer, which is in the form of a light mobile liquid, is poured into the mixing container. The appropriate amount of resin B is then added to the mixture. Next the methoxyethoxy silane is added. Finally, the peroxide initiator, which preferably is in liquid form, is added. The mixture may be continuously mechanically blended during addition of its components, with a mixing paddle, for example. Blending is continued until the mixture becomes homogeneous. No chemical reactions are involved in the mixing.

Then the stator is evacuated and filled with the liquid mixture by conventional vacuum impregnating techniques. For example, the stator is preheated to a temperature of 75°–85° C. and then evacuated to an absolute pressure of about 50 millitorr. Then the vacuum pump is valved off and the freshly vacuum degassed impregnant is allowed to flood the interior of the evacuated stator structure, the motor housing serving as the containment vessel for the entire process. After a 2–3 minute soak under vacuum, the system is opened to atmospheric pressure and allowed to stand, full of impregnant for 15–20 minutes in order to complete the impregnation. The impregnant is then allowed to drain back into a storage tank, which is equipped for vacuum degassing. The stator is then placed in an oven and held at 165° C. for 2 hours after the stator has reached oven temperature in order to cure the impregnant. The stator is then cooled and excess cured impregnant is removed. The stator is then ready for assembly with the rotor of the motor.

The composition of the following examples, while useful in the invention, are not as preferred as the optimum formulation of Example I.

EXAMPLE II

| | Material | % by Weight |
|---|---|---|
| 1. | Resin A-1 1,3 butadiene homopolymer (major resin) | 46.8 |
| 2. | Tert-butyl styrene monomer (monofunctional vinyl monomer) | 31.2 |
| 3. | Divinyl benzene monomer (55% solution) (multifunctional vinyl monomer) | 5.9 |
| 4. | Resin B-1, 1,3 butadiene homopolymer (flexibilizing resin) | 15.6 |
| 5 | 2,5 dimethyl-2,5-bis (tert-butyl peroxy) hexane (initiator-free radical source) | 0.4 |
| 6. | Vinyl-tris (beta-methoxyethoxy) silane (additive) | 0.1 |
| | | 100.0 |

The formulation in Example II is mixed and used in the vacuum impregnation process in exactly the same manner as is the composition set forth in Example I. However, the viscosity of the composition of Example II is somewhat higher than is preferred for optimum processability and speed of impregnation.

EXAMPLE III

| | Material | % by Weight |
|---|---|---|
| 1. | Resin A-1, 1,3 butadiene homopolymer (major resin) | 46.8 |
| 2. | Tert-butyl styrene monomer (monofunctional vinyl monomer) | 31.2 |
| 3. | Divinylbenzene monomer (55% solution) (multifunctional vinyl monomer) | 15.6 |
| 4. | Resin B-2, 1,3 butadiene homopolymer (flexibilizing resin) | 5.9 |
| 5. | 2,5 dimethyl-2,5-bis (tert-butyl peroxy) hexane (initiator-free radical source) | 0.4 |
| 6. | Vinyl-tris (beta-methoxyethoxy) silane (additive) | 0.1 |
| | | 100.0 |

Resin B-2, the flexibilizing resin, is a homopolymer of 1,3 butadiene, having a molecular weight of approximately 5000, and a medium (~45%) portion of 1,2 vinyl microstructure. The molecular structure of resin B-2 can be represented as shown below:

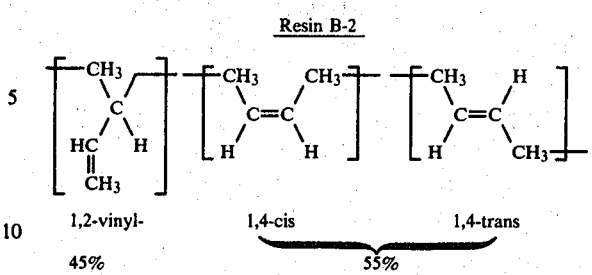

Resin B-2 is commercially available from Revertex, Ltd., Temple Fields, Harlow, Essex, England, under the tradename Lithene N-5000. Typical properties of resin B-2 are listed below:

| Chemical composition | |
|---|---|
| polybutadiene | 99–100% |
| terminal benzyl | nil |
| Approximate microstructure of polybutadiene segments: | |
| vinyl 1,2 | 45% |
| trans and cis 1,4 | 55% |
| Appearance and physical form | clear, colorless liquid |
| Molecular weight ($\overline{M}_n$) | 5000 approx. |
| Viscosity (Brookfield) | |
| at 25° C. | 80 poise |
| at 50° C. | 25 poise |
| Density | 0.89 g/ml |
| Flash point (C.O.C.) | >260° C. |
| Solvent and other volatiles | ≯1% by wt. |
| Alkali metal ions | ≯50 ppm |

The composition of Example III is mixed and used in the vacuum impregnation process in exactly the same manner as is the composition of Example I.

However, the viscosity of this composition is considerably higher than is preferred for optimum processability and speed of impregnation. The composition of Example III, when cured for 2 hours at 165° C., had approximately twice the amount of weight loss during cure compared to the composition of Example I. The composition of Example III also cured to form an appreciably harder material than did the composition of Example I. These last two differences illustrate effects due to the higher 1,2 vinyl content, and hence higher reactivity of resin B-2 as compared to resin B-1.

| | Material | % by Weight |
|---|---|---|
| 1. | Resin A-1, 1,3 butadiene homopolymer (major resin) | 46.9 |
| 2. | Tert-butylstyrene monomer (monofunctional vinyl monomer) | 31.2 |
| 3. | Divinyl benzene monomer (55% solution) (multifunctional vinyl monomer) | 5.9 |
| 4. | Resin B-1, 1,3 butadiene homopolymer (flexibilizing resin) | 15.6 |
| 5. | 2,5 dimethyl-2,5-bis (tert-butyl peroxy) hexane (initiator-free radical source) | 0.4 |
| | | 100.0 |

The composition of Example IV is mixed and used in the same manner as the composition of Example I. It has almost the same viscosity as the composition of Example II and has lower adhesion to stator lamination surfaces than the composition of Example I.

EXAMPLE V

| | Material | % by Weight |
|---|---|---|
| 1. | Resin A-1, 1,3 butadiene homopolymer (major resin) | 46.9 |
| 2. | Tert-butyl styrene monomer (monofunctional vinyl monomer) | 31.2 |
| 3. | Divinyl benzene monomer (55% solution) (multifunctional vinyl monomer) | 5.9 |
| 4. | Resin B-2, 1,3 butadiene homopolymer (flexibilizing resin) | 15.6 |
| 5. | 2,5 dimethyl-2,5-bis (tert-butyl peroxy) hexane (initiator-free radical source) | 0.4 |
| | | 100.0 |

The composition of Example V is mixed and used in the same manner as the composition of Example I. The viscosity, hardness, and adhesion properties, however, are not as desirable.

EXAMPLE VI

| | Material | % by Weight |
|---|---|---|
| 1. | Resin A-1, 1,3 butadiene homopolymer (major resin) | 56.9 |
| 2. | Tert-butyl styrene monomer monofunctional vinyl monomer) | 37.9 |
| 3. | Divinyl benzene monomer (55% solution) (multifunctional vinyl monomer) | 4.7 |
| 4. | 2,5-dimethyl-2,5-bis (tert-butyl peroxy) hexane (initiator-free radical source) | 0.5 |
| | | 100.0 |

The composition of Example VI is mixed and used in the same manner as in Example I (but without resin B-1). This composition, lacking the moderating effects of resin B-1 or B-2, shows a hardness and weight loss higher than is preferred.

EXAMPLE VII

| | Material | % by Weight |
|---|---|---|
| 1. | Resin A-1, 1,3 butadiene homopolymer (major resin) | 56.9 |
| 2. | Vinyl toluene monomer (monofunctional vinyl monomer) | 37.9 |
| 3. | Divinyl benzene monomer (55% solution) (multifunctional vinyl monomer) | 4.7 |
| 4. | 2,5-dimethyl-2,5-bis (tert-butyl peroxy) hexane (initiator-free radical source) | 0.5 |
| | | 100.0 |

The vinyl toluene monomer, the monofunctional vinyl monomer, is available commercially from Dow Chemical Co., Midland, Mich.

The mixing and impregnating procedure is the same as in Example I. The composition of Example VII, when cured for 2 hours at 165° C. shows a weight loss and hardness which are both higher than preferred. The use of the more volatile vinyl toluene monomer in place of tertbutyl styrene monomer as in Example VI contributes to the higher weight loss.

EXAMPLE VIII

| | Material | % by Weight |
|---|---|---|
| 1. | Resin A-1, 1,3 butadiene homopolymer (major resin) | 54.9 |
| 2. | Vinyl toluene monomer (monofunctional vinyl monomer) | 36.5 |
| 3. | Divinyl benzene monomer 55% solution) (multi-functional vinyl monomer) | 6.8 |
| 4. | Dicumyl peroxide (initiator-free radical source) | 1.8 |
| | | 100.0 |

The dicumyl peroxide initiator is available from Lucidol Div., Pennwalt Corporation, Buffalo, N.Y. as LUPEROX 500-T. The mixing and impregnating procedure is the same as used in Example I except that it is preferred to melt the solid LUPEROX 500-T before adding it to the mixing vessel. This composition shows a higher than preferred weight loss during a 2 hour cure at 165° C. The cured material is also harder than is preferred.

EXAMPLE IX

| | Material | % by Weight |
|---|---|---|
| 1. | Resin A-2, 1,3 butadiene homopolymer (major resin) | 55.2 |
| 2. | Vinyl toluene monomer (monofunctional vinyl monomer) | 23.7 |
| 3. | Divinyl benzene monomer (multifunctional vinyl monomer) | 7.9 |
| 4. | LUPERSOL 101 (initiator-free radical source) | 1.4 |
| 5. | Resin B-2, LITHENE N-5000 (flexibilizing resin) | 11.8 |
| | | 100.0 |

Resin A-2 is a medium molecular weight (~3000) homopolymer of 1,3 butadiene having a very high (~90%) portion of 1,2 vinyl microstructure. It is available commercially through Hystl Development Company, One Space Park, Redondo Beach, Calif. under the trade name Hystl B-3000. Resin A-2 has a molecular structure which may be represented as shown below:

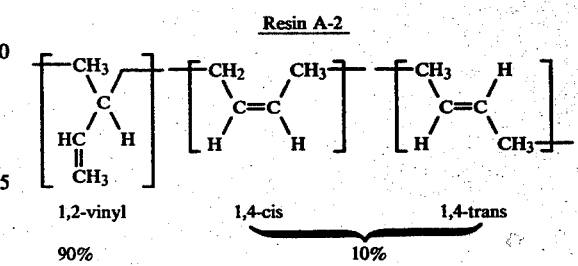

Typical properties of resin A-2 are listed below:

| | |
|---|---|
| Viscosity, poise, at 45° C. | 205 |
| at 30° C. | 800 |
| at 25° C. | 1500 |
| Molecular weight | 3000 |
| Color, Gardner | <1 |
| Specific gravity, 25/25° C. | 0.87 |
| Pounds per gallon | 7.25 |
| Flash point, TAG closed cup | <300° F. |

| -continued | |
|---|---|
| Microstructure, vinyl 1,2 | 90% |

It may be desirable to heat resin A-2 before using it in mixing a formulation, in order to reduce its viscosity to a level convenient for handling and mixing.

Even though resin A-2 is of lower molecular weight than resin B-2, it is of much higher 1,2 vinyl content and therefore serves well as the major resin. The portion of 1,2 vinyl in the microstructure is of more importance than the molecular weight.

After a two hour cure at 165° C., the cured material shows a hardness close to optimum. Weight loss during cure is acceptably low. However, it is not as low as in the preferred Example I. Mixing and impregnating are done in the same manner as in Example I with the exception noted previously relative to warming the resin before mixing.

EXAMPLE X

| | Material | % by Weight |
|---|---|---|
| 1. | Resin A-3, 1,3 butadiene homopolymer (major resin) | 63.0 |
| 2. | Vinyl toluene monomer (monofunctional vinyl monomer) | 27.0 |
| 3. | Divinyl benzene monomer (55% solution) (multifunctional vinyl monomer) | 9.0 |
| 4. | LUPERSOL 101 | 1.0 |
| | | 100.0 |

Resin A-3 is a medium (~1800) molecular weight homopolymer of 1,3 butadiene, having a high portion (~80%) of 1,2 vinyl microstructure which is available commercially from Colorado Chemical Specialties Co., Golden, Colo., under the tradename of RICON 154. Its molecular structure may be represented as shown below:

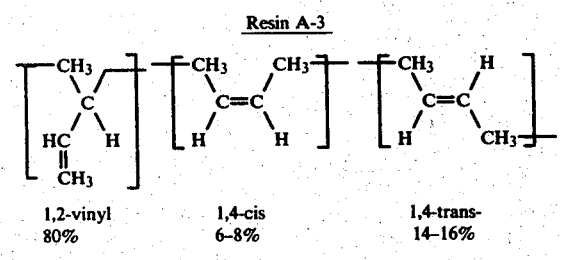

Resin A-3

| 1,2-vinyl | 1,4-cis | 1,4-trans- |
|---|---|---|
| 80% | 6–8% | 14–16% |

Typical properties of resin A-3 are listed below:

| | |
|---|---|
| chemical composition | 1,2 polybutadiene |
| solvent | none |
| nonvolatile matter, Wt. % | 98.5% |
| microstructure | 80 ± 5% 1,2 vinyl |
| molecular weight average (Mw) | 1,800 ± 200 |
| physical state | hazy, very viscous liquid |
| viscosity Brookfield at 45° C., cps | 80,000 ± 60,000 |
| specific gravity | 0.89 |
| bulk density | 7.4 lbs/gal |
| flash point (Tag closed cup) °F. | >300 |
| acid number KOH/g | Nil |
| Gardner color | 3 maximum |
| dilute solution viscosity (6g resin/100ml of solvent) | 0.099 ± .006 (Heptane) |

Due to its very high viscosity, it may be desirable to heat resin A-3 before incorporating it into the impregnant mixture. By heating resin A-3, its viscosity can be reduced to a level suitable for ease in mixing.

This composition is mixed and used in the manner set forth in Example I with the exception already noted for the mixing procedure. After a two hour cure at 165° C., the material is quite hard and shows a relatively high weight loss during cure.

EXAMPLE XI

| | Material | % by Weight |
|---|---|---|
| 1. | Resin A-3, 1,3 butadiene homopolymer (major resin) | 64.0 |
| 2. | Vinyl toluene monomer (monofunctional vinyl monomer) | 27.4 |
| 3. | Divinyl benzene monomer (multifunctional vinyl monomer) | 6.8 |
| 4. | LUPEROX 500-T | 1.8 |
| | | 100.0 |

This composition has essentially the same less than optimum characteristics found in the previous example, and has the further disadvantage of requiring melting of the solid LUPEROX 500-T prior to the mixing procedure.

The previous examples have illustrated the use of materials yielding an essentially all hydrocarbon cured system, having maximum resistance to hydrolytic attack under the most severe conditions. Where maximum hydrolytic stability is not imperative, it may be of advantage to incorporate acrylate or methacrylate multifunctional monomers into the formulation. These monomers do contain ester linkages that are incorporated into the cured material and that are subject to hydrolytic attack. However, the location of these ester linkages in the molecular structure of the cured material is such that no major chain scission is likely to occur should they be hydrolyzed. The following are examples of the use of a multifunctional methacrylate monomer in place of the all hydrocarbon multifunctional vinyl monomer, divinyl benzene.

EXAMPLE XII

| | Material | % by Weight |
|---|---|---|
| 1. | Resin A-1, 1,3 butadiene homopolymer (major resin) | 54.1 |
| 2. | Vinyl toluene monomer (monofunctional vinyl monomer) | 36.0 |
| 3. | Trimethylolpropane trimethacrylate monomer (multifunctional methacrylate monomer) | 9.0 |
| 4. | LUPERSOL 101 | 0.9 |
| | | 100.0 |

Mixing and impregnation are the same as for Example I. This composition, after curing for 2 hours at 165° C., shows a weight loss higher than preferred and is harder than preferred. The multifunctional vinyl monomer, trimethylolpropane trimethacrylate is available from Sartomer Company, West Chester, Pa. under the tradename SR-350.

EXAMPLE XIII

| | Material | % by Weight |
|---|---|---|
| 1. | Resin A-2, 1,3 butadiene homopolymer (major resin) | 65.7 |
| 2. | Vinyl toluene monomer (monofunctional vinyl monomer) | 28.2 |
| 3. | Sartomer SR-350 (multifunctional methacrylate monomer) | 4.7 |
| 4. | LUPERSOL 101 (initiator-free radical source) | 1.4 |
| | | 100.0 |

Mixing and use in impregnation are the same as in Example I with the exception noted in Example IX. This composition, when cured two and one-half hours at 155° C., showed quite close to the optimum hardness and weight loss of the composition in the preferred Example I. These desirable properties were obtained without the use of a resin B, a flexibilizing resin. However, the previous comments regarding hydrolytic stability as a result of using multifunctional methacrylate or acrylate monomers still apply to this formulation.

It will be appreciated by those skilled in the art that many compositions other than those set forth in the preceding Examples may be successfully employed in the practice of this invention, although they may well not be as desirable as the composition set forth in the preferred Example I. In general, useful compositions may be found within, but not necessarily restricted to, the following ranges:

| | Material | Parts by weight |
|---|---|---|
| 1. | Resin type A (major resin) | 30-80 |
| 2. | Monofunctional monomer | 20-70 |
| 3. | Multifunctional monomer | 0-20 |
| 4. | Resin type B (flexibilizing resin) | 0-80 |
| 5. | Initiator (free radical source) | 0.1-10 |
| 6. | Additive | 0-5 |

While not apparent from the foregoing Examples, a resin type B polymer may be used without a resin type A polymer. These compositions, in general, have longer cure times and higher than optimum weight losses during cure but nonetheless may be useful in the practice of this invention. Such compositions may be found within, but not necessarily restricted to, the following ranges:

| | Material | Parts by weight |
|---|---|---|
| 1. | Resin type B | 30-80 |
| 2. | Monofunctional vinyl monomer | 0-70 |
| 3. | Multifunctional monomer | 0-30 |
| 4. | Initiator (free radical source) | 0-10 |
| 5. | Additive | 0-5 |

In the two preceding generalized formulations, the materials may be defined as listed below:

1. Resin type A—A high reactivity (50-98%) 1,2 vinyl content, homopolymer or copolymer of 1,3 butadiene, 1,000-14,000 molecular weight.
2. Vinyl monomer—A monomeric liquid or solid, containing one reactive group per molecule, this reactive group being capable of undergoing a vinyl type addition reaction.
3. Crosslinking monomer—A monomeric liquid or solid containing two or more reactive groups, these groups being capable of undergoing a vinyl type addition.
4. Resin type B—A low reactivity (2-49%) 1,2 vinyl content, homopolymer or copolymer of 1,3 butadiene, 200-5,000 molecular weight.
5. Initiator—A source of free radicals, capable of producing these free radicals at an appreciable rate (half-life ≦10 hours) at a temperature between 100° C. and 180° C.
6. Additive—Any material capable of producing a desired change in properties, especially flow properties, surface tension or adhesion to a given substrate.

It will also be appreciated by those skilled in the art that there exist many materials, resins, monomers, initiators, additives, etc. which may be successfully employed in the practice of the invention. Some possible alternative materials are noted below, but this listing is in no way to be considered limiting or restricting.

1. Resin type A:

RICON 150
RICON 154
RICON 157
RICON 159
RICON 100
RICON 102
RICON 104
RICON 170
RICON 500
RICON 109
RICON 155
    Colorado Chemical Specialties Co., Golden, Colorado Hystyl B-1000
Hystyl B-2000
Hystyl B-3000
Hystyl C-1000
Hystyl C-2000
Hystyl G-1000
Hystyl G-2000
Hystyl G-3000
    Hystyl Development Co., One Space Park, Redondo Beach, California 2. Monofunctional monomer:

styrene
vinyltoluene
tert-butyl styrene
2-methyl styrene
methyl methacrylate
monochloro styrene
isobutyl methacrylate 3. Multifunctional monomer:

trimethylopropane trimethacrylate
divinyl benzene
triallyl cyanurate
diallyl maleate
diallylphthalate
pentaerylthrytol tetraacrylate
pentaerythrytol triacrylate
trimethylolpropane triacrylate 4. Resin type B:

LITHENE N-5000
LITHENE N-4-5000
LITHENE PL
LITHENE PM
LITHENE PH
LITHENE PL-4
LITHENE PM-4
LITHENE PH-4
    Revertex Ltd., Temple Fields, Harlow, Essex, England 5. Initiators:

2,5-dimethyl-2,5-bis-(tert-butylperoxy) hexane
2,5-dimethyl-2,5-bis-(tert-butylperoxy) hexyne-3
dicumyl peroxide
di-tert-butylperoxide
tert-butyl perbenzoate 6. Additives:

vinyltriethoxy silane
vinyl-tris-(2-methoxyethoxy silane)

-continued

| | |
|---|---|
| vinyltriacetoxy silane | |

The cured impregnating material will ideally be a tough, semi-flexible transparent solid, having excellent adhesion and bonding to all surfaces of the stator structure, especially the stator laminations and the glass tape end turn wrappings. Since the impregnating mixture becomes a part of the composite dielectric system in the stator, it should ideally have excellent dielectric properties. Such desirable properties include:

| | |
|---|---|
| Dielectric strength | >400 volts per mil 0.01 "thick" sample |
| Dielectric constant | <3.5 at 60 Hz between 20° C. and 260° C. |
| Loss tangent (dissipation factor) | <0.05 at 60 Hz between 20° C. and 260° C. |

These dielectric properties will ideally be retained without significant change in the presence of water.

Weight losses during cure (due to monomer evaporation) should be low, less than 5% when measured on a 15 g sample in a 60 mm diameter aluminum weighing dish. Hardness values on a cured sample such as the one used for weight loss determination should be between a value of 50 on the Shore "A" scale and a value of 50 on the Shore "D" scale.

Figure 3:
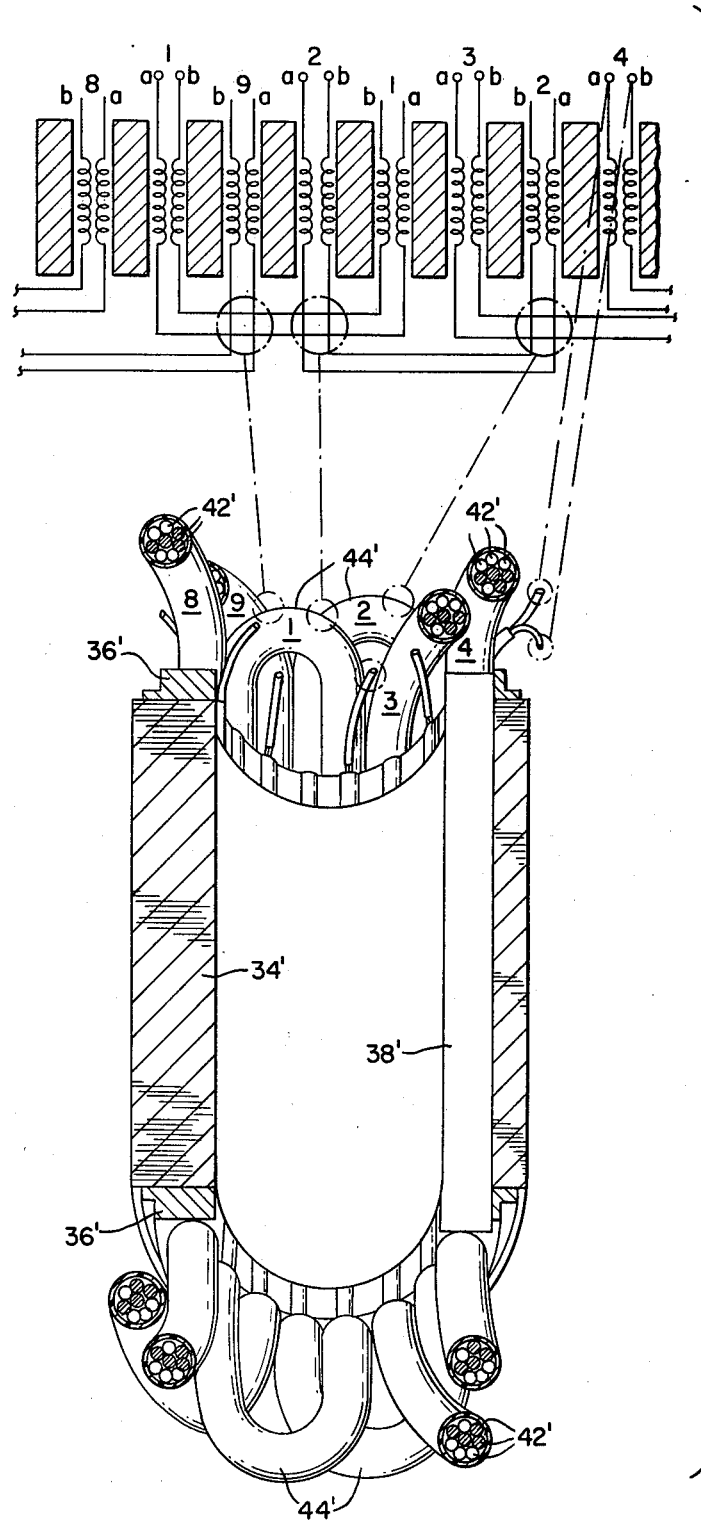
FIG. 3 is a perspective view of a longitudinally sliced statorette employed in testing the invention, the statorette being shown in conjunction with a diagram illustrating the arrangement of the windings employed for test purposes.

To facilitate the testing of the new insulation system in accordance with the invention, as well as the standard system referred to earlier, multiple units of a device termed a "statorette" were built. In essence, each statorette is a miniature version of the stators actually employed in oil-filled submergible electric pump motors, but with a winding pattern constructed to facilitate electrical testing. FIG. 3 illustrates half of a statorette that has been sliced longitudinally. The statorette comprises a stack of steel laminations 34', insulating end laminations 36', stator slots 38', and nine separate windings or test coils 1-9, each a bifilar winding a, b and each having eight turns. The conductors 42' of the windings are inserted in slot liners, and the end turns are wrapped in glass cloth tape 44', the shading of some conductor ends distinguishing a from b. Only one end of each conductor pair must be accessible. Some of the accessible conductor ends have been encircled in the figure. The winding pattern is shown diagrammatically at the top of FIG. 3, with the cross-over points (and some accessible conductor ends) correlated in the upper and lower portions of the figure. Except for the winding pattern, the bifilar windings are essentially the same as in an actual stator. The insulation materials were all drawn from production stock and correspond to those employed in actual stators. The magnet wire is also standard magnet wire employed in actual stators.

In the particular thermal aging tests described hereinafter, one group of statorettes was vacuum impregnated with the standard BC325 varnish employed in prior motors as described earlier, and another group of statorettes was impregnated with an impregnant in accordance with Example I. The statorettes were all subjected to a voltage proof test before and after impregnation to eliminate effects of any mechanical damage which might have occurred during the winding. Then the statorettes were tested in accordance with a test cycle derived from the guides set forth in IEEE Standard 98-1972. Each statorette was placed in a 2-liter Parr chemical autoclave (bomb), which was employed as the aging chamber, the temperature of which could be adjusted. Aging tests were performed at nominal temperatures of 135° C., 150° C., 165° C., and 185° C. The bombs were filled about three-fourths full with standard motor oil (just sufficient to cover the uppermost end turns), and a glass test tube containing approximately 60 milliliters of distilled water was placed in the bore of the statorette. This amount of water was sufficient to ensure that at all times the system would be completely saturated with water and have an excess of liquid water present, thereby simulating the environment in a motor which has leaked.

An estimate was made of how long a given statorette might be expected to last before failing, and the heat aging was interrupted at a time corresponding to about one-tenth of the estimated mean time to failure. The bomb containing the statorette was then cooled to room temperature and placed in a −40° C. freezer overnight. Then it was removed from the freezer and allowed to warm back to room temperature, after which the statorette was removed from the Parr bomb and subjected to electrical proof tests to determine the integrity remaining in the dielectric system.

The electrical tester employed was a Hipotronics 30 KV, 60 Hz dielectric tester. The test voltages employed in the electrical testing of each cycle of the thermal aging test were set to be about 10% higher than the highest voltage ever to be expected in actual use of a motor. Three kinds of voltage tests were employed. In one test a voltage of 500 volts RMS was applied between the two wires wich comprise a bifilar winding. This placed a voltage stress across the insulating film on the two lengths of wire (each approximately 6 feet long) involved in the particular bifilar coil. A second type of voltage test was the application of a voltage of 3500 volts RMS between both wires of one of the bifilar coils and the stator laminations. This placed a voltage stress across the wire insulating film and the slot liner material in series. Both conductors of the bifilar coil were tied in parallel for this test. A third test was the application of a voltage of 3500 volts RMS between two adjacent bifilar coils. In other words, the two wires in coil 1, for example, were connected in parallel, the two wires in coil 2, for example, were connected in parallel, and a voltage was applied between these two coils. Stator iron was floating during this test, and the voltage test was applied essentially across the end turns of the coils. This test placed a voltage stress between end turns at the cross-over points.

From the foregoing tests, an assessment of the integrity of the magnetic wire film, the ground insulation, and the insulation on the end turns could be made. A leakage current of more than 15 milliamperes was considered as a failure reading. A failure (voltage breakdown) in any one of the three voltage tests was considered to be a failure of the test sample.

In the case of thermal aging tests involving the standard varnish, the preponderance of failures was between adjacent wires in the same bifilar coil. In other words, the insulating film on the magnet wires was the first part of the system to degrade to the point where it would no longer support the required level of voltage.

After the completion of the voltage testing part of each test cycle, the statorette was replaced in the Parr bomb, and heat aging was continued for a period of time equal to the first aging period. Cyclic aging and electrical testing were continued to determine the actual life before failure.

In analyzing the test data generated, IEEE Standard 101-1972 Guide For The Statistical Analysis Of Thermal Life Test Data was followed quite closely. Briefly, the times to failure at a given temperature were analyzed statistically and fitted to an appropriate statistical distribution. From the statistical analysis of the distribution of time to failure at a given temperature, the time to a 50% probability of failure was derived.

The laboratory tests show a time to a 50% probability of failure for the insulating system with the standard varnish of 432 hours at 185° C. (the worst test case), where the pressure in the bomb is 170 psia. The lifetimes experienced are far shorter than those expected from published data on the insulation system components. After 2280 hours of aging time at 185° C., there have been no failures in a statorette impregnated with an impregnant in accordance with the invention. The test results clearly demonstrate a substantial increase in the life of oil-filled submergible electric pump motors manufactured in accordance with the invention.

It is apparent from the foregoing description that a prime requisite for a composition used in the practice of this invention is hydrolytic stability. From the foregoing, it is now apparent that the standard insulation system referred to earlier suffers from hydrolytic instability. A measure of this is given in the results of the thermal aging tests previously described, wherein the time to 50% probability of failure for statorette samples aged at 185° C. in water saturated oil was 432 hours. A hydrolytically stable insulation system in accordance with this invention should show at least a 50% improvement in mean time to failure over the hydrolytically unstable system when tested as described herein, for example at a temperature of 185° C.

While preferred embodiments of the invention have been shown and described, it will be apparent to those skilled in the art that changes can be made in these embodiments without departing from the principles and spirit of the invention, the scope of which is defined in the appended claims.

I claim:

1. In an oil-filled submergible electric pump motor, a stator structure with stator windings covered by a hydrolytically stable insulating layer comprising an addition polymer, the stator structure comprising an insulation system, including said layer, having a 50% probability of failure at 185° C. in water-saturated oil that is at least 50% greater than 432 hours.

2. A motor in accordance with claim 1, wherein the insulating layer comprises a polybutadiene.

3. In an oil-filled submergible electric pump motor, a stator structure with stator windings covered by a hydrolytically stable insulating layer, the insulating layer comprising a polymer or copolymer of 1,3 butadiene having a high portion of 1,2 vinyl microstructure crosslinked with a polymer or copolymer of 1,3 butadiene having a low portion of 1,2 vinyl microstructure.

4. A motor in accordance with claim 3, wherein the insulating layer includes at least one vinyl monomer.

5. A motor in accordance with claim 4, wherein the insulating layer also includes an agent for promoting adhesion of the layer to the windings.

6. A stator structure for an oil-filled submergible electric pump motor impregnated by an impregnant produced by heat curing a liquid homopolymer or copolymer of 1,3 butadiene.

7. A stator structure in accordance with claim 6, wherein the stator structure is impregnated with said impregnant by vacuum impregnation prior to the heat curing.

8. In an oil-filled submergible electric pump motor, a stator structure with stator windings covered by a hydrolytically stable insulating layer, the insulating layer having the following composition:

| Material | Parts by Weight |
| --- | --- |
| 1. Resin type A | 30–80 |
| 2. Monofunctional monomer | 20–70 |
| 3. Multifunctional monomer | 0–20 |
| 4. Resin type B | 0–80 |
| 5. Initiator | 0.1–10 |
| 6. Additive | 0–5 | wherein the materials are defined as follows:
1. Resin type A—a high reactivity (50–98%) 1,2 vinyl content, homopolymer or copolymer of 1,3 butadiene
2. Monofunctional monomer—a monomeric liquid or solid, containing one reactive group per molecule, this reactive group being capable of undergoing a vinyl type addition reaction
3. Multifunctional monomer—a monomeric liquid or solid containing two or more reactive groups, these groups being capable of undergoing a vinyl type addition
4. Resin type B—a low reactivity (2–49%) 1,2 vinyl content, homopolymer or copolymer of 1,3 butadiene
5. Initiator—a source of free radicals, capable of producing these free radicals at an appreciable rate (half-life $\leq$ 10 hours) at a temperature between 100° C. and 180° C.
6. Additive—any material capable of producing a desired change in properties, especially flow properties, surface tension or adhesion to a given substrate.

9. In an oil-filled submergible electric pump motor, a stator structure with stator windings covered by a hydrolytically stable insulating layer, the insulating layer having the following composition:

| Material | Parts by Weight |
| --- | --- |
| 1. Resin type B | 30–80 |
| 2. Monofunctional vinyl monomer | 0–70 |
| 3. Multifunctional monomer | 0–30 |
| 4. Initiator | 0–10 |
| 5. Additive | 0–5 | wherein the materials are defined as follows:
1. Resin type B—a low reactivity (2–49%) 1,2 vinyl content, homopolymer or copolymer of 1,3 butadiene
2. Monofunctional vinyl monomer—a monomeric liquid or solid, containing one reactive group per molecule, this reactive group being capable of undergoing a vinyl type addition reaction
3. Multifunctional monomer—a monomeric liquid or solid containing two or more reactive groups, these groups being capable of undergoing a vinyl type addition
4. Initiator—a source of free radicals, capable of producing these free radicals at an appreciable rate (half-life $\leq$ 10 hours) at a temperature between 100° C. and 180° C.
5. Additive—any material capable of producing a desired change in properties, especially flow properties, surface tension or adhesion to a given substrate.

* * * * *

UNITED STATES PATENT AND TRADEMARK OFFICE
CERTIFICATE OF CORRECTION

PATENT NO. : 4,275,319
DATED : June 23, 1981
INVENTOR(S) : Paul W. Davis, Jr.

It is certified that error appears in the above-identified patent and that said Letters Patent are hereby corrected as shown below:

Column 4, line 28, "125°F" should read -- 125°C --.

Column 6, line 54, "prssure" should read -- pressure --.

Column 10, line 49, the heading -- EXAMPLE IV -- should be inserted above the tabular listing.

Signed and Sealed this

Fifteenth Day of September 1981

|SEAL|

Attest:

GERALD J. MOSSINGHOFF

Attesting Officer

Commissioner of Patents and Trademarks